United States Patent
Liu et al.

(10) Patent No.: US 11,364,466 B2
(45) Date of Patent: Jun. 21, 2022

(54) AUTOMATIC CONTROL SYSTEM FOR EMISSION INDEXES OF DESULFURIZATION DEVICE OF THERMAL POWER UNIT AND METHOD THEREOF

(71) Applicant: SHANG'AN POWER PLANT OF HUANENG POWER INTERNATIONAL, INC., Shijiazhuang (CN)

(72) Inventors: Zhijie Liu, Shijiazhuang (CN); Gejun Qi, Shijiazhuang (CN); Yulong Hao, Shijiazhuang (CN); Qingzhou Hou, Shijiazhuang (CN); Wenzhi Liu, Shijiazhuang (CN); Yang Chen, Shijiazhuang (CN); Qi Chen, Shijiazhuang (CN); Yanlou Du, Shijiazhuang (CN); Xuefei Zhong, Shijiazhuang (CN)

(73) Assignee: Shang'an Power Plant of Huaneng Power International, Inc., Shijiazhuang (CN)

(*) Notice: Subject to any disclaimer, the term of this patent is extended or adjusted under 35 U.S.C. 154(b) by 0 days.

(21) Appl. No.: 17/237,998

(22) Filed: Apr. 22, 2021

(65) Prior Publication Data

US 2022/0040633 A1 Feb. 10, 2022

(30) Foreign Application Priority Data

Aug. 5, 2020 (CN) .......................... 202010777459.8

(51) Int. Cl.
*B01D 53/30* (2006.01)
*B01D 53/34* (2006.01)
(Continued)

(52) U.S. Cl.
CPC ........... *B01D 53/346* (2013.01); *B01D 53/30* (2013.01); *B01D 53/501* (2013.01); *B01D 53/80* (2013.01)

(58) Field of Classification Search
CPC ...... B01D 53/80; B01D 53/30; B01D 53/501; B01D 2259/126; B01D 2258/0283;
(Continued)

(56) References Cited

U.S. PATENT DOCUMENTS 4,150,096 A * 4/1979 Nelms .................. B01D 53/501
 423/243.1
4,164,549 A * 8/1979 Selmeczi ............. B01D 53/501
 423/243.1
(Continued)

*Primary Examiner* — Timothy C Vanoy
(74) *Attorney, Agent, or Firm* — Marshall, Gerstein & Borun LLP

(57) ABSTRACT

The present disclosure provides an automatic control system for emission indexes of a desulfurization device of a thermal power unit, which comprises a first controller, a second controller and a flow controller. At the same time, the present disclosure provides an automatic control method for emission indexes of a desulfurization device of a thermal power unit. The present disclosure runs through the production and operation data of waste gas desulfurization treatment facilities, and establishes a pH optimization set value prediction model according to the data, and can realize automatic regulation and control of pH value by optimizing and controlling the pH optimization set value and the slurry flow optimization set value every moment through the dynamic model, thus solving the problem that the pH value control process is large in lag and slow in dynamics, and improving the pH value control quality.

9 Claims, 2 Drawing Sheets

(51) Int. Cl.
*B01D 53/50* (2006.01)
*B01D 53/80* (2006.01)

(58) Field of Classification Search
CPC ....... B01D 53/346; B01J 4/00; B01J 19/0033; B01J 2219/00966; G05B 1/00; G05B 6/00; G05B 6/05; G05B 13/00; G05B 13/0255; G05D 7/00; G05D 7/0623; G05D 21/00
See application file for complete search history.

(56) References Cited

U.S. PATENT DOCUMENTS

| | | | |
|---|---|---|---|
| 7,522,963 B2 * | 4/2009 | Boyden | B01D 53/8696 422/111 |
| 2021/0275964 A1 * | 9/2021 | Kokubo | B01D 53/185 |

* cited by examiner

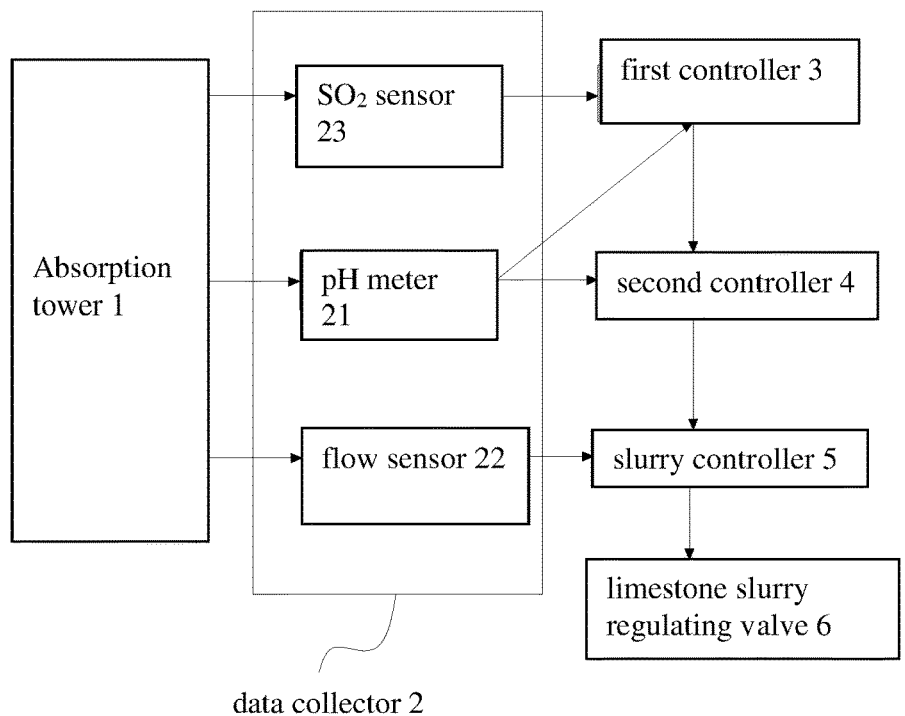

FIG. 3

| step 1, collecting the real-time pH value and SO₂ concentration at the outlet of the absorption tower (1) and the slurry flow signal at the outlet of the limestone slurry regulating valve (6) |
|---|
| step 2, receiving the SO₂ concentration at the outlet of the absorption tower (1), calculating and obtaining the pH optimization set value based on the pH optimization set value prediction model constructed based on the GPC algorithm, and sending the pH optimization set value |
| step 3, receiving the real-time pH value at the outlet of the absorption tower (1), receiving the pH optimization set value, calculating and obtaining the slurry flow optimization set value, and sending the slurry flow optimization set value |
| step 4, receiving the slurry flow signal at the outlet of the limestone slurry regulating valve (6), receiving the slurry flow optimization set value, and outputting a limestone slurry flow control signal; wherein the limestone slurry flow control signal is used to adjust the open degree of the limestone slurry regulating valve (6) so that the real-time pH value reaches the pH optimization set value |

AUTOMATIC CONTROL SYSTEM FOR EMISSION INDEXES OF DESULFURIZATION DEVICE OF THERMAL POWER UNIT AND METHOD THEREOF

TECHNICAL FIELD

The present disclosure relates to the technical field of desulfurization of a thermal power unit, in particular to an automatic control system for emission indexes of a desulfurization devices of a thermal power unit. In addition, the present disclosure further relates to an automatic control method for emission indexes of a desulfurization device of a thermal power unit.

BACKGROUND

In order to protect the environment, it is necessary to control $SO_2$ emission from coal-fired power plants. At present, there are three ways to control $SO_2$ emission from coal-fired power plants: desulfurization before combustion, desulfurization during combustion and desulfurization after combustion. Desulfurization after combustion, that is, flue gas desulfurization, is the most effective way to control $SO_2$ emission at present, and it is also a widely used way in the world. Limestone-gypsum wet flue gas desulfurization is the technology widely used in flue gas desulfurization at present. The limestone-gypsum wet flue gas desulfurization process uses limestone as the alkaline desulfurization absorbent. Limestone blocks are pre-crushed, mixed with water in a ball mill, ground into slurry, and delivered to a desulfurization absorption tower by a pump. Fresh desulfurizer enters a slurry pool of the absorption tower to mix with circulating slurry. The circulating slurry is lifted to a spray layer at the top of tower by a pump, and is dispersed into mist droplets by a nozzle. The mist droplets mix with acid flue gas during falling, and calcium carbonate in slurry droplets undergoes a series of physical and chemical absorption reactions with $SO_2$ in flue gas to generate calcium sulfite. At the same time, with the decrease of pH value, calcium sulfite reacts further with oxygen in blown-in oxidizing air in the slurry pool of the absorption tower to generate calcium sulfate. After calcium sulfate reaches a certain saturation, it crystallizes out and finally generates gypsum ($CaSO_4 \cdot H_2O$). Desulfurized flue gas removes fine droplets carried by flue gas through a demister and is discharged into a chimney. After gypsum slurry discharged from the absorption tower is concentrated and dehydrated by a dehydration system, the gypsum is sold as a by-product. Waste water is partially reused after simple treatment, and the discharged waste water is discharged up to standard after treatment. The whole process mainly comprises an absorption tower system, a limestone slurry preparation system and a gypsum dehydration treatment system. The absorption tower is provided with two outlets, one of which is the gypsum slurry outlet for detecting the real-time pH, that is, detecting the pH of the gypsum slurry outlet; the other of which is a clean flue gas outlet for detecting $SO_2$ concentration, that is, detecting the $SO_2$ concentration in the clean flue gas outlet.

The flue gas reaction in the limestone wet desulfurization absorption tower is a process large in lag and slow in dynamics, and the desulfurization system is a complex control system, which brings great challenges to the conventional Proportional Integral Derivative (PID) control strategy. Therefore, in order to optimize the performance and operation parameters of the desulfurization process, Distributed Control System (DCS) control strategy is generally adopted at present. The operators of the DCS control strategy adjust the main control indexes of Flue Gas Desulphurization (FGD) according to experience through the pH set value or the frequency of a limestone slurry supply frequency converter, and then control the $SO_2$ concentration at the outlet. However, the pH value control quality in the current control loop is not ideal, and operators often change to manual operation.

In view of this, it has become an urgent problem for those skilled in the art to develop an automatic control system for emission indexes of a desulfurization devices of a thermal power unit, which can improve the pH value control quality, realize the closed-loop control of $SO_2$ concentration at the outlet, and further ensure the desulfurization control quality.

SUMMARY

In view of this, the present disclosure aims to provide an automatic control system for emission indexes of a desulfurization devices of a thermal power unit, so as to improve the pH value control quality, realize the closed-loop control of $SO_2$ concentration at the outlet, and further ensure the desulfurization control quality.

In order to achieve the above purpose, the technical scheme of the present disclosure is realized as follows.

The present disclosure provides an automatic control system for emission indexes of a desulfurization device of a thermal power unit, wherein the desulfurization device of the thermal power unit is provided with an absorption tower and a limestone slurry regulating valve, wherein the automatic control system for emission indexes of a desulfurization device of a thermal power unit comprises a first controller comprising a first input terminal, a first memory, a first output terminal and a first processor; wherein the first processor is configured to receive the $SO_2$ concentration at the outlet of the absorption tower through the first input terminal, calculate and obtain the pH optimization set value according to the pH optimization set value prediction model constructed based on GPC algorithm and stored in the first memory, and send the pH optimization set value through the first output terminal;

a second controller comprising a second input terminal, a third input terminal, a second output terminal and a second processor; wherein the second processor is configured to receive the real-time pH value at the outlet of the absorption tower through the second input terminal, receive the pH optimization set value through the third input terminal, calculate and obtain the slurry flow optimization set value, and send the slurry flow optimization set value through the second output terminal;

a flow controller comprising a fourth input terminal, a fifth input terminal and a third processor, wherein the third processor is configured to receive the slurry flow signal at the outlet of a limestone slurry regulating valve through the fourth input terminal, receive the slurry flow optimization set value through the fifth input terminal, and output a limestone slurry flow control signal; and the limestone slurry flow control signal is used to adjust the open degree of the limestone slurry regulating valve so that the real-time pH value reaches the pH optimization set value.

Further, the automatic control system for emission indexes of a desulfurization device of a thermal power unit further comprises a data collector which comprises a pH meter, a flow sensor and an $SO_2$ sensor; wherein the pH meter and the $SO_2$ sensor are connected to the outlet of the absorption tower, respectively, and the flow sensor is connected to the outlet of the limestone slurry regulating valve.

Further, the construction method of the pH optimization set value prediction model is $$A(q^{-1})y_t = B(q^{-1})u_{t-d} + \xi_t/\Delta \quad (1)$$

where A and B are known coefficient matrices, $y_t$ is $SO_2$ concentration at the outlet of the absorption tower 1 at time t; d is the duration of the minimum pure delay step number; $\Delta$ is the difference operator; $q^{-1}$ is the backward step translation factor; $\xi_t$ is the irrelevant random noise sequence with bounded zero mean variance; $u_{t-d}$ is the pH optimization set value at time t-d.

Further, the first controller comprises a sixth input terminal, and the first processor is configured to receive $SO_2$ concentration at the outlet of the absorption tower through the first input terminal, receive the real-time pH value at the outlet of the absorption tower through the sixth input terminal, calculate and obtain the pH optimization set value according to the pH optimization set value prediction model constructed based on GPC algorithm and stored in the first memory, and send the pH optimization set value through the first output terminal; the construction method of the pH optimization set value prediction model is $$A(q^{-1})\Delta y_t = B(q^{-1})\Delta u_{t-d} + \xi_t \quad (2)$$

where $\Delta y_t$ is the variation of $SO_2$ concentration at the outlet of the absorption tower 1 at time t, and $\Delta^{u_{t-d}}$ is the variation of the pH optimization set value at time t-d.

At the same time, the present disclosure further provides an automatic control method for emission indexes of a desulfurization device of a thermal power unit.

In order to achieve the above purpose, the technical scheme of the present disclosure is realized as follows:

The present disclosure provides an automatic control method for emission indexes of a desulfurization device of a thermal power unit, wherein the desulfurization device of the thermal power unit is provided with an absorption tower and a limestone slurry regulating valve, wherein the automatic control method for emission indexes of a desulfurization device of a thermal power unit comprises the steps of step 1, collecting the real-time pH value and $SO_2$ concentration at the outlet of the absorption tower and the slurry flow signal at the outlet of the limestone slurry regulating valve;

step 2, receiving the $SO_2$ concentration at the outlet of the absorption tower, calculating and obtaining the pH optimization set value based on the pH optimization set value prediction model constructed based on the GPC algorithm, and sending the pH optimization set value;

step 3, receiving the real-time pH value at the outlet of the absorption tower, receiving the pH optimization set value, calculating and obtaining the slurry flow optimization set value, and sending the slurry flow optimization set value;

step 4, receiving the slurry flow signal at the outlet of the limestone slurry regulating valve, receiving the slurry flow optimization set value, and outputting a limestone slurry flow control signal; wherein the limestone slurry flow control signal is used to adjust the open degree of the limestone slurry regulating valve so that the real-time pH value reaches the pH optimization set value.

Further, in step 3, the construction method of the pH optimization set value prediction model is $$A(q^{-1})y_t = B(q^{-1})u_{t-d} + \xi_t/\Delta \quad (1)$$

where A and B are known coefficient matrices, $y_t$ is $SO_2$ concentration at the outlet of the absorption tower 1 at time t; $u_t$ is the pH optimization set value at time t, d is the duration of the minimum pure delay step number; $\Delta$ is the difference operator; $q^{-1}$ is the backward step translation factor; $\xi_t$ is the irrelevant random noise sequence with bounded zero mean variance; $u_{t-d}$ is the pH optimization set value at time t-d.

Further, the construction method of the pH optimization set value prediction model is $$A(q^{-1})\Delta y_t = B(q^{-1})\Delta u_{t-d} + \xi_t \quad (2)$$

where $\Delta y_t$ is the variation of $SO_2$ concentration at the outlet of the absorption tower 1 at time t, and $\Delta^{u_{t-d}}$ is the variation of the pH optimization set value at time t-d.

Compared with the prior art, the present disclosure has the following advantages.

1. The present disclosure runs through the production and operation data of waste gas desulfurization treatment facilities, and establishes a pH optimization set value prediction model according to the data, and can realize automatic regulation and control of pH value by optimizing and controlling the pH optimization set value and the slurry flow optimization set value every moment through the dynamic model, thus solving the problem that operators adjust the pH set value or the frequency of a limestone slurry supply frequency converter according to experience in the prior art, as well as the problem that the pH value control process is large in lag and slow in dynamics, and improving the pH value control quality. In addition, the closed-loop control of $SO_2$ concentration at the outlet can be realized, thus ensuring the desulfurization control quality. On the one hand, the present disclosure can greatly reduce the operation intensity of operators and avoid the blind area of the absorption tower 1 caused by manual adjustment. On the other hand, the optimal operation cost of the desulfurization system can be achieved on the basis of meeting the requirements of environmental protection emission, saving energy and reducing consumption, and providing a reliable guarantee for the long-term economic operation of an FGD device.

BRIEF DESCRIPTION OF THE DRAWINGS

The drawings forming a part of the present disclosure are used to provide a further understanding of the present disclosure. The illustrative embodiments of the present disclosure and their descriptions are used to explain the present disclosure, rather than constitute an improper limitation of the present disclosure. In the drawings:

FIG. 3 is a schematic diagram of one embodiment of an automatic control system for emission indexes of a desulfurization device of a thermal power unit according to Embodiment 1 of the present disclosure;

FIG. 4 is a schematic diagram of an automatic control method for emission indexes of a desulfurization device of a thermal power unit according to Embodiment 2 of the present disclosure.

DETAILED DESCRIPTION

It should be noted that the embodiments of the present disclosure and the features in the embodiments can be combined with each other without conflict.

The present disclosure will be described in detail with reference to the drawings and embodiments.

Embodiment 1

Figure 1:
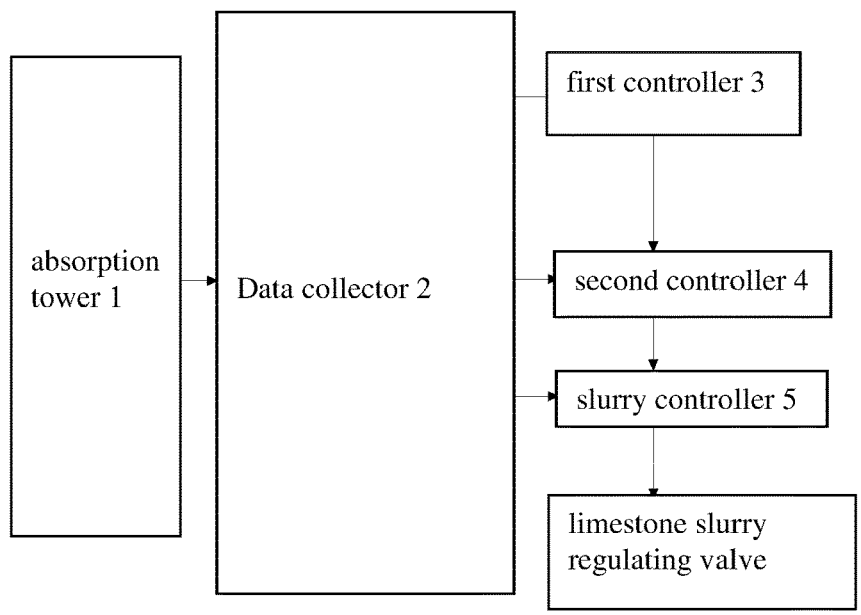
FIG. 1 is a frame schematic diagram of an automatic control system for emission indexes of a desulfurization device of a thermal power unit according to Embodiment 1 of the present disclosure.
Figure 2:
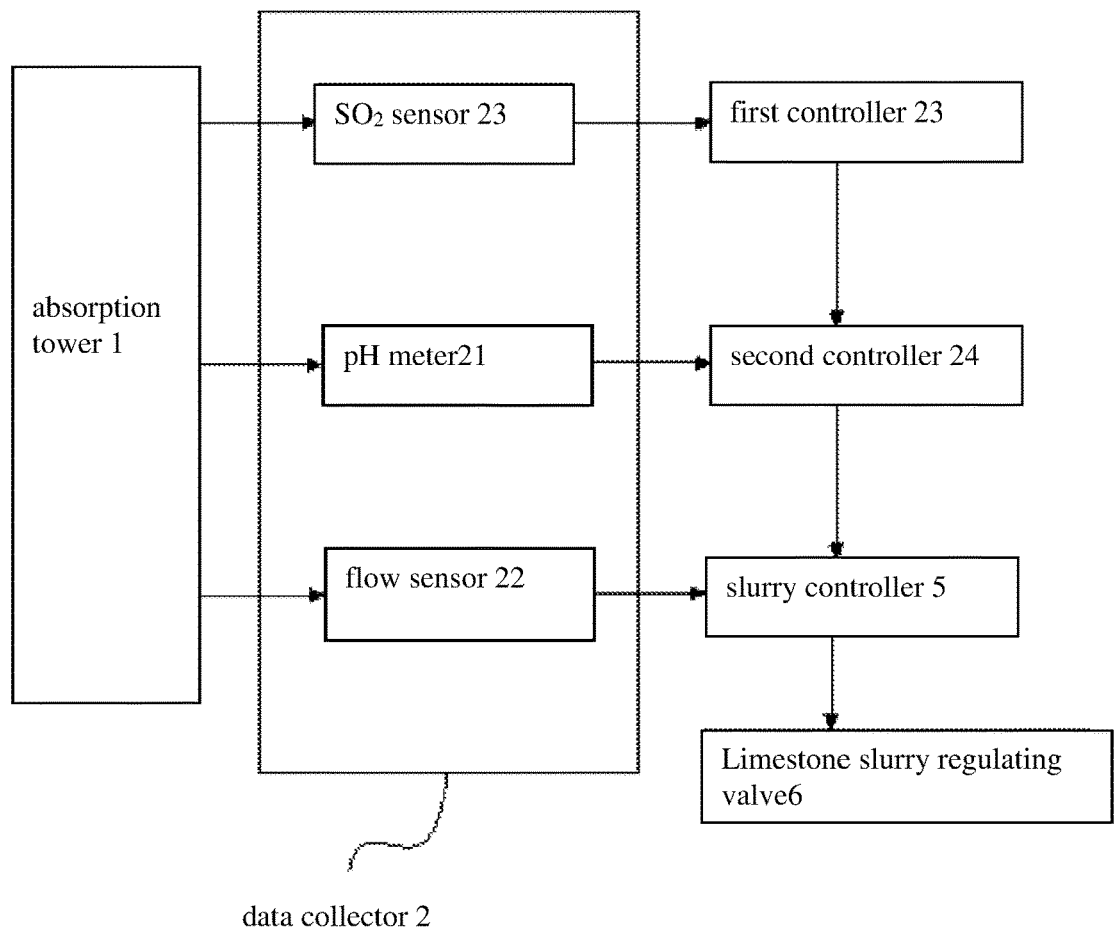
FIG. 2 is a schematic diagram of one embodiment of an automatic control system for emission indexes of a desulfurization device of a thermal power unit according to Embodiment 1 of the present disclosure.

The embodiment relates to an automatic control system for emission indexes of a desulfurization device of a thermal power unit, wherein an exemplary structure is shown in FIG. 1 to FIG. 3. The existing desulfurization device of a thermal power unit is provided with an absorption tower 1 and a limestone slurry regulating valve 6. Specifically, the absorption tower 1 is the core part of the FDG, in which desulfurization reaction occurs. The pH value in the absorption tower 1 changes obviously with power load, sulfur content of coal and slurry concentration, and the $SO_2$ concentration at the outlet also changes. Therefore, when the working conditions change, it is necessary to adjust the limestone slurry flow in real time in order to control the $SO_2$ concentration at the outlet.

It can be seen from FIG. 1 to FIG. 3 that the automatic control system for emission indexes of a desulfurization device of a thermal power unit comprises a first controller 3, a second controller 4 and a flow controller 5. The first controller 3 comprises a first input terminal, a first memory, a first output terminal and a first processor; the first processor is configured to receive the $SO_2$ concentration at the outlet of the absorption tower 1 through the first input terminal, calculate and obtain the pH optimization set value according to the pH optimization set value prediction model constructed based on GPC algorithm and stored in the first memory, and send the pH optimization set value through the first output terminal.

Specifically, in this embodiment, the $SO_2$ concentration at the outlet is transmitted to an intranet server, and the intranet server is connected to the Internet of Things vision collecting device and the cloud server. The cloud server has a built pH optimization set value prediction model already. The pH optimization set value prediction model runs through the production and operation data of waste gas desulfurization treatment facilities, which classifies the historical operation data and sorts them into the following models $$A(q^{-1})y_t = B(q^{-1})u_{t-d} + \xi_t/\Delta \quad (1)$$

where $y_t$ is $SO_2$ concentration at the outlet of the absorption tower 1; d is the minimum pure delay step number; $\Delta$ is the difference operator; $q^{-1}$ is the backward step translation factor; $\xi_t$ is the irrelevant random noise sequence with bounded zero mean variance; $u_{t-d}$ is the pH optimization set value at time t-d;

$$A(q^{-1}) = a_0 + a_1 q^{-1} + \ldots + a_{n_a} q^{-1};$$

$$B(q^{-1}) = b_0 + b_1 q^{-1} + \ldots + b_{n_b} q^{-1};$$

In the pH optimization set value prediction model, the values determined by A and B can be obtained by historical data analysis. A and B are both known coefficient matrices, which are obtained by the ARMA model online identifier (refer to Bai Hongxia "A Class of ARMA Model Online Identifiers" published in Journal of Foshan University (Natural Science Edition) in 2009). The specific values of d, $\Delta$ and $q^{-1}$ can be obtained through historical data analysis according to a certain application device, but once the application device changes, d, $\Delta$ and $q^{-1}$ will change accordingly. The values of $\Delta$ and $q^{-1}$ are obtained by a Controlled Autoregressive Integral Moving Average (CARIMA) model, which can refer to a predictive control strategy of a deep peak shaving coordination system of an ultra-supercritical unit proposed by CN110579968A. d is the pure lag time of pH to $SO_2$ concentration at the outlet of the absorption tower 1, and the actual data can be obtained by testing, that is, how long it will take for the $SO_2$ concentration to change after the pH value increases. The value of d can be obtained according to the collected signal. $\{\xi_t\}$ is a relevant undisturbed signal, which is processed statistically by modelart in the cloud, so that it will not affect the real optimization result.

In this embodiment, according to formula (1), $u_{t-d}$, that is, the pH optimization set value at time t-d can be calculated and obtained. However, in the specific calculation process, due to the existence of the hysteresis effect, $u_{t-d}$ is the pH optimization set value at time t, that is, the pH optimization set value sent by the first output terminal. In this embodiment, $u_{t-d}$ is a time series, which calculates and outputs $u_{t-d}$, $u_{t-d+1}$, ... $u_{t-1}$ by rolling.

In order to further improve the performance of the automatic control system for emission indexes of a desulfurization device of a thermal power unit, in one specific embodiment of the present disclosure, the first controller 3 comprises a sixth input terminal, and the first processor is configured to receive $SO_2$ concentration at the outlet of the absorption tower 1 through the first input terminal, receive the real-time pH value at the outlet of the absorption tower 1 through the sixth input terminal, calculate and obtain the pH optimization set value according to the pH optimization set value prediction model constructed based on GPC algorithm and stored in the first memory, and send the pH optimization set value through the first output terminal; the construction method of the pH optimization set value prediction model is $$A(q^{-1})\Delta y_t = B(q^{-1})\Delta u_{t-d} + \xi_t \quad (2)$$

where $\Delta^{y_t}$ is the variation of $SO_2$ concentration at the outlet of the absorption tower 1 at time t, and $\Delta^{u_{t-d}}$ is the variation of the pH optimization set value at time t-d. d is the minimum pure delay step number, which is the delay time in this embodiment, that is, the delay relative to $SO_2$. d depends on the design of the absorption tower. By adopting the incremental model, the calculation speed of the dynamic model can be increased and the optimal control can be ensured at all times. The cloud server transmits the formula (2) and related numerical values to the intranet server, the calculation is completed in the intranet server, and the pH optimization set value is obtained after the calculation is completed. The calculated pH optimization set value is transmitted to the second controller 4.

In this embodiment, $\Delta^{u_{t-d}}$ can be calculated and obtained according to formula (2), that is, the variation of the pH optimization set value at time t-d. However, in the specific calculation process, due to the existence of the hysteresis effect, $\Delta^{u_{t-d}}$ is the variation of the pH optimization set value at time t. The variation is the difference between the pH optimization set value at time t and the real-time pH, i.e. $\Delta^{u_{t-d}}$=the pH optimization set value at time t minus the real-time pH, where the real-time pH is the pH value at the outlet of the absorption tower 1 at time t. Therefore, $\Delta^{u_{t-d}}$ is summed with the real-time pH to obtain the desired value $u_{t-d}$, that is, the pH optimization set value sent by the first output terminal.

A second controller 4 comprises a second input terminal, a third input terminal, a second output terminal and a second processor. The second processor is configured to receive the real-time pH value at the outlet of the absorption tower 1 through the second input terminal, receive the pH optimization set value through the third input terminal, calculate and obtain the slurry flow optimization set value, and send the slurry flow optimization set value through the second output terminal. The slurry flow optimization set value is determined by a slurry flow optimization set value prediction model, which is also a model predictive control. The slurry flow optimization set value prediction model is constructed based on the PID algorithm, which is similar to the pH optimization set value prediction model. The slurry flow optimization set value prediction model is stored in the cloud server, and the specific calculation of the PID algorithm is completed in the intranet server. The PID algorithm is a PID controller (also referred to as a PID regulator) which controls according to the proportion (P), integral (I) and differential (D) of deviation in process control, and it is one of the most widely used automatic controllers.

PID incremental algorithm is as follows:

$$u(k)=u(k)-u(k-1)$$

$$u(k)=K_p[e(k)-e(k-1)]+K_{ie}(k)+K_d[e(k)-2e(k-1)+e(k-2)]$$

where $\Delta u(k)$ is the variation of slurry flow, $e(k)$ is the variation of pH, k is the current time, $u(k)$ is the current slurry flow, $u(k-1)$ is the slurry flow at the previous time, $e(k-1)$ is the variation of pH at the previous time, $e(k-2)$ is the variation of pH at the previous two moments, $K_p$ is a proportional parameter, $K_{ie}$ is an integral parameter, and $K_d$ is a differential parameter. As the PID algorithm is commonly used at present, it will not be described here. After the calculation, the slurry flow optimization set value is obtained and transmitted to the flow controller 5. Specifically, the flow controller 5 regards the slurry flow signal and the slurry flow optimization set value as PID parameters, and adopts the PID control technology to control the limestone slurry regulating valve 6, so as to change the size of slurry flow, so that the pH value in the absorption tower 1 reaches the pH optimization set value.

The flow controller 5 comprises a fourth input terminal, a fifth input terminal and a third processor. The third processor is configured to receive the slurry flow signal at the outlet of a limestone slurry regulating valve 6 through the fourth input terminal, receive the slurry flow optimization set value through the fifth input terminal, and output a limestone slurry flow control signal; and the limestone slurry flow control signal is used to adjust the open degree of the limestone slurry regulating valve 6 so that the real-time pH value reaches the pH optimization set value.

In this embodiment, the first input terminal receives $SO_2$ concentration at the outlet of the absorption tower 1, the second input terminal receives the real-time pH value at the outlet of the absorption tower 1, and the fourth input terminal receives the slurry flow signal at the outlet of the limestone slurry regulating valve 6, all of which are acquired by a data collecting device. Specifically, in this embodiment, the data collecting task can be completed through the Internet of Things visual collecting device. Preferably, the automatic control system for emission indexes of a desulfurization device of a thermal power unit further comprises a data collector 2 which comprises a pH meter 21, a flow sensor 22 and an $SO_2$ sensor 23. The pH meter 21 has one end connected to the outlet of the absorption tower 1 and the other end connected to the second input terminal of the second controller 4. The $SO_2$ sensor 23 has one end connected to the outlet of the absorption tower 1 and the other end connected to the first input terminal of the first controller 3. The flow sensor 22 has one end connected to the outlet of the limestone slurry regulating valve 6 and the other end connected to the fourth input terminal of the flow controller 5.

The automatic control system for emission indexes of a desulfurization device of a thermal power unit adopts model predictive control technology, takes the real-time pH value of the absorption tower 1 and the change of $SO_2$ concentration at the outlet of the absorption tower 1 into account, optimizes the limestone slurry flow and the pH value of the absorption tower 1 in real time by a variable optimal control method, and analyzes, calculates and outputs parameters by software, thus finally improving the control quality of the FGD unit. After the system is put into operation, the $SO_2$ concentration at the outlet can be controlled within the standard deviation of 10.2 mg/Nm³, which is improved by 52.1% when being compared with the standard deviation of 21.3 mg/Nm³ of the $SO_2$ concentration at the outlet in the prior art.

To sum up, this embodiment runs through the production and operation data of waste gas desulfurization treatment facilities, and establishes a pH optimization set value prediction model according to the data, and can realize automatic regulation and control of pH value by optimizing and controlling the pH optimization set value and the slurry flow optimization set value every moment through the dynamic model, thus solving the problem that operators adjust the pH set value or the frequency of a limestone slurry supply frequency converter according to experience in the prior art, as well as the problem that the pH value control process is large in lag and slow in dynamics, and improving the pH value control quality. In addition, the closed-loop control of $SO_2$ concentration at the outlet can be realized, thus ensuring the desulfurization control quality. On the one hand, the present disclosure can greatly reduce the operation intensity of operators and avoid the blind area of the absorption tower 1 caused by manual adjustment. On the other hand, the optimal operation cost of the desulfurization system can be achieved on the basis of meeting the requirements of environmental protection emission, saving energy and reducing consumption, and providing a reliable guarantee for the long-term economic operation of an FGD device.

Embodiment 2

The embodiment relates to an automatic control method for emission indexes of a desulfurization device of a thermal power unit, wherein the desulfurization device of the thermal power unit is provided with an absorption tower 1 and a limestone slurry regulating valve 6. As shown in FIG. 4, the automatic control method for emission indexes of a desulfurization device of a thermal power unit comprises the steps of step 1, collecting the real-time pH value and $SO_2$ concentration at the outlet of the absorption tower 1 and the slurry flow signal at the outlet of the limestone slurry regulating valve 6;

step 2, receiving the $SO_2$ concentration at the outlet of the absorption tower 1 through the first input terminal, calculating and obtaining the pH optimization set value based on the pH optimization set value prediction model constructed based on the GPC algorithm, and sending the pH optimization set value through the first input terminal, by the first processor;

step 3, receiving the real-time pH value at the outlet of the absorption tower 1 through the second input terminal, receiving the pH optimization set value through the third input terminal, calculating and obtaining the slurry flow optimization set value, and sending the slurry flow optimization set value through the second output terminal, by the second processor;

step 4, receiving the slurry flow signal at the outlet of the limestone slurry regulating valve 6 through the fourth input terminal, receiving the slurry flow optimization set value through the fifth input terminal, and outputting a limestone slurry flow control signal, by the third processor; step 5, using the limestone slurry flow control signal to adjust the open degree of the limestone slurry regulating valve 6 so that the real-time pH value reaches the pH optimization set value.

The foregoing is only a preferred embodiment of the present disclosure, rather than limit the present disclosure. Any modifications, equivalent substitutions, improvements, etc. made within the spirit and principles of the present disclosure shall be included in the scope of protection of the present disclosure.

What is claimed is:

1. An automatic control system for emission indexes of a desulfurization device of a thermal power unit, wherein the desulfurization device of the thermal power unit is provided with an absorption tower and a limestone slurry regulating valve, wherein the automatic control system comprises
a first controller comprising a first input terminal, a first memory, a first output terminal and a first processor; wherein the first processor is configured to receive the $SO_2$ concentration at the outlet of the absorption tower through the first input terminal, calculate and obtain the pH optimization set value according to the pH optimization set value prediction model constructed based on GPC algorithm and stored in the first memory, and send the pH optimization set value through the first output terminal;
a second controller comprising a second input terminal, a third input terminal, a second output terminal and a second processor; wherein the second processor is configured to receive the real-time pH value at the outlet of the absorption tower through the second input terminal, receive the pH optimization set value through the third input terminal, calculate and obtain the slurry flow optimization set value, and send the slurry flow optimization set value through the second output terminal;
a flow controller comprising a fourth input terminal, a fifth input terminal and a third processor, wherein the third processor is configured to receive the slurry flow signal at the outlet of a limestone slurry regulating valve through the fourth input terminal, receive the slurry flow optimization set value through the fifth input terminal, and output a limestone slurry flow control signal; and the limestone slurry flow control signal is used to adjust the open degree of the limestone slurry regulating valve so that the real-time pH value reaches the pH optimization set value.

2. The automatic control system for emission indexes of a desulfurization device of a thermal power unit according to claim 1, further comprising a data collector which comprises a pH meter, a flow sensor and an $SO_2$ sensor; wherein the pH meter and $SO_2$ sensor are connected to the outlet of the absorption tower, respectively, and the flow sensor is connected to the outlet of the limestone slurry regulating valve.

3. The automatic control system for emission indexes of a desulfurization device of a thermal power unit according to claim 1, wherein the construction method of the pH optimization set value prediction model is $$A(q^{-1})y_t = B(q^{-1})u_{t-d} + \xi_t/\Delta \quad (1)$$

where A and B are known coefficient matrices, $y_t$ is $SO_2$ concentration at the outlet of the absorption tower at time t; d is the duration of the minimum pure delay step number; $\Delta$ is the difference operator; $q^{-1}$ is the backward step translation factor; $\xi_t$ is the irrelevant random noise sequence with bounded zero mean variance; $u_{t-d}$ is the pH optimization set value at time t-d.

4. The automatic control system for emission indexes of a desulfurization device of a thermal power unit according to claim 3, wherein the first controller comprises a sixth input terminal, and the first processor is configured to receive $SO_2$ concentration at the outlet of the absorption tower through the first input terminal, receive the real-time pH value at the outlet of the absorption tower through the sixth input terminal, calculate and obtain the pH optimization set value according to the pH optimization set value prediction model constructed based on GPC algorithm and stored in the first memory, and send the pH optimization set value through the first output terminal; the construction method of the pH optimization set value prediction model is $$A(q^{-1})\Delta y_t = B(q^{-1})\Delta u_{t-d} + \xi_t \quad (2)$$

where $\Delta^{y_t}$ is the variation of $SO_2$ concentration at the outlet of the absorption tower at time t, and $\Delta^{u_{t-d}}$ is the variation of the pH optimization set value at time t-d.

5. An automatic control method for emission indexes of a desulfurization device of a thermal power unit, wherein the desulfurization device of the thermal power unit is provided with an absorption tower and a limestone slurry regulating valve, wherein the automatic control method comprises the steps of step 1, collecting the real-time pH value and $SO_2$ concentration at the outlet of the absorption tower and the slurry flow signal at the outlet of the limestone slurry regulating valve;
step 2, receiving the $SO_2$ concentration at the outlet of the absorption tower, calculating and obtaining the pH optimization set value based on the pH optimization set value prediction model constructed based on the GPC algorithm, and sending the pH optimization set value;
step 3, receiving the real-time pH value at the outlet of the absorption tower, receiving the pH optimization set value, calculating and obtaining the slurry flow optimization set value, and sending the slurry flow optimization set value;
step 4, receiving the slurry flow signal at the outlet of the limestone slurry regulating valve, receiving the slurry flow optimization set value, and outputting a limestone slurry flow control signal; wherein the limestone slurry flow control signal is used to adjust the open degree of the limestone slurry regulating valve so that the real-time pH value reaches the pH optimization set value.

6. The automatic control method for emission indexes of a desulfurization device of a thermal power unit according to claim 5, wherein, in step 3, the construction method of the pH optimization set value prediction model is $$A(q^{-1})y_t = B(q^{-1})u_{t-d} + \xi_t/\Delta \quad (1)$$

where A and B are known coefficient matrices, $y_t$ is $SO_2$ concentration at the outlet of the absorption tower at time t; $u_t$ is the pH optimization set value at time t, d is the duration of the minimum pure delay step number; $\Delta$ is the difference operator; $q^{-1}$ is the backward step translation factor; $\xi_t$ is the irrelevant random noise sequence with bounded zero mean variance; $u_{t-d}$ is the pH optimization set value at time t-d.

7. The automatic control method for emission indexes of a desulfurization device of a thermal power unit according to claim 6, wherein the construction method of the pH optimization set value prediction model is $$A(q^{-1})\Delta y_t = B(q^{-1})\Delta u_{t-d} + \xi_t \qquad (2)$$

where $\Delta^{y_t}$ is the variation of $SO_2$ concentration at the outlet of the absorption tower at time t, and $\Delta^{u_{t-d}}$ is the variation of the pH optimization set value at time t-d.

8. The automatic control system for emission indexes of a desulfurization device of a thermal power unit according to claim 2, wherein the construction method of the pH optimization set value prediction model is $$A(q^{-1})y_t = B(q^{-1})u_{t-d} + \xi_t/\Delta \qquad (1)$$

where A and B are known coefficient matrices, $y_t$ is $SO_2$ concentration at the outlet of the absorption tower at time t; d is the duration of the minimum pure delay step number; $\Delta$ is the difference operator; $q^{-1}$ is the backward step translation factor; $\xi_t$ is the irrelevant random noise sequence with bounded zero mean variance; $u_{t-d}$ is the pH optimization set value at time t-d.

9. The automatic control system for emission indexes of a desulfurization device of a thermal power unit according to claim 8, wherein the first controller comprises a sixth input terminal, and the first processor is configured to receive $SO_2$ concentration at the outlet of the absorption tower through the first input terminal, receive the real-time pH value at the outlet of the absorption tower through the sixth input terminal, calculate and obtain the pH optimization set value according to the pH optimization set value prediction model constructed based on GPC algorithm and stored in the first memory, and send the pH optimization set value through the first output terminal; the construction method of the pH optimization set value prediction model is $$A(q^{-1})\Delta y_t = B(q^{-1})\Delta u_{t-d} + \xi_t \qquad (2)$$

where $\Delta^{y_t}$ is the variation of $SO_2$ concentration at the outlet of the absorption tower at time t, and $\Delta^{u_{t-d}}$ is the variation of the pH optimization set value at time t-d.

* * * * *

UNITED STATES PATENT AND TRADEMARK OFFICE
CERTIFICATE OF CORRECTION

PATENT NO. : 11,364,466 B2
APPLICATION NO. : 17/237998
DATED : June 21, 2022
INVENTOR(S) : Zhijie Liu et al.

It is certified that error appears in the above-identified patent and that said Letters Patent is hereby corrected as shown below:

In the Claims

At Column 9, Line 22, "comprises" should be -- comprises: --.

At Column 10, Line 23, "$\Delta^{yt}$" should be -- $\Delta y_t$ --.

At Column 10, Line 24, "$\Delta^{u_{t-d}}$" should be -- $\Delta u_{t-d}$ --.

At Column 11, Line 5, "$\Delta^{yt}$" should be -- $\Delta y_t$ --.

At Column 11, Line 6, "$u_{t-d}$" should be -- $\Delta u_{t-d}$ --.

At Column 12, Line 16, "$\Delta^{yt}$" should be -- $\Delta y_t$ --.

At Column 12, Line 17, "$\Delta^{u_{t-d}}$" should be -- $\Delta u_{t-d}$ --.

Signed and Sealed this
Twenty-fourth Day of January, 2023

Katherine Kelly Vidal
*Director of the United States Patent and Trademark Office*